United States Patent Office 3,205,133
Patented Sept. 7, 1965

3,205,133
N,N'-BIS-(HETEROCYCLICAMINOALKYL)-ALKYL-ENEDIAMINES AND THERAPEUTIC USES THEREFOR
John H. Biel and Wallace K. Hoya, Milwaukee, Wis., assignors to Colgate-Palmolive Company, a corporation of Delaware
No Drawing. Filed Sept. 27, 1961, Ser. No. 141,010
18 Claims. (Cl. 167—65)

This invention relates to chemical compounds which have pharmacological activity. More particularly, this invention is concerned with heterocyclicamino-containing derivatives of alkylenediamines and diimines, and the activity of such compounds against diseases in animals.

This application is a continuation-in-part of our co-pending applications Serial No. 16,199 filed March 21, 1960, and now abandoned, and Serial No. 66,944 filed November 3, 1960, and now abandoned.

According to the present invention it has been found that N,N'-bis-[(2-heterocyclicamino)-alkyl] - alkylenediamines and diimines of the formulas

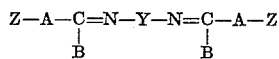

and

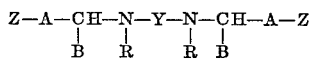

wherein Y is a lower straight or branched alkylene group of at least two carbons in the chain between the nitrogens with advisably not more than eight carbons such as ethylene, propylene, isopropylene and butylene, A is a chemical bond or a lower straight or branched alkylene, advisably of not more than five carbons, B is hydrogen or a lower straight or branched alkylene, advisably of not more than five carbons, R is hydrogen, a lower alkyl such as methyl, ethyl, propyl and butyl and groups of the formula

in which $R_2$ is a lower alkyl, and Z represents 2-pyridyl, 2-pyrryl, 2-indolyl, 3-isoindolyl, 2-quinolyl and 3-isoquinolyl, produce a lowering of the blood pressure in animals and also reverse the presser effects of epinephrine. The compounds are thus useful in the treatment of hypertension in animals.

The N,N'-bis - [(2 - cyclicamino) - alkyl] - alkylenediamines and diimines can be produced by reacting an alkylenediamine with a 2-heterocyclicamino alkanone or alkanal to produce an intermediate N,N-[(2-heterocyclicamino)-alkyl]-alkylenediimine which is reduced to give the corresponding N,N'-bis-[(2-heterocyclicamino)-alkyl]-alkylenediamine. This process can be represented as follows:

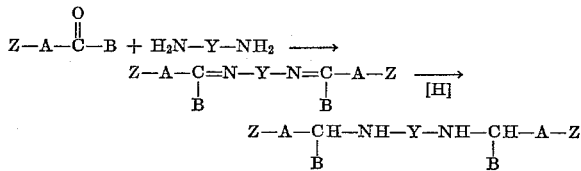

wherein Y, Z, A and B have the assigned meaning.

Some of the 2-alkanone and 2-alkanal-containing cyclicamines which can be used in the process are 2-acetylpyridine, 2-formylpyridine, 2-formylpyrrole, 2-acetylpyrrole, 2-pyridyl acetaldehyde, 3-(2-pyridyl)-propionaldehyde, 3-(2-pyrryl)-propionaldehyde, 1-(2-pyridyl) - 2-propanone, 1-(2-pyrryl)-2-propanone, 1-(2 - pyridyl) - 3-butanone, 1-(2-pyrryl) - 3 - butanone, 2 - acetylindolyl, 2-acetylquinolyl and 1-(3-isoindolyl)-2-propanone.

Representative of the alkylenediamines which can be used in the process are ethylenediamine, 1,3-propylenediamine, 1,4-butylenediamine, 1,5-pentylenediamine, 1,2-propylenediamine, 1,2-butylenediamine and 2,3-butylenediamine.

Reaction between the 2-heterocyclicamino alkanone or alkanal and the alkylenediamine is advisably effected by bringing the reactants together in an inert liquid reaction medium, and preferably one in which the reactants are soluble. Benzene is a particularly suitable reaction medium. Elevated temperatures such as the reflux temperature are generally employed to bring the reaction to completion in a short time. However, instead of refluxing the mixture the water formed in the reaction can be distilled off, as in an azeotropic mixture with the solvent. The product can be recovered from the reaction mixture by filtration when it is insoluble, or if it is soluble in the reaction medium, by evaporating the solvent.

Some of the imines which are produced in the first step of the process are

N,N'-bis-(alpha-2-pyridylethyl)-ethylenediimine,
N,N'-bis-(alpha-2-pyridylethyl)-1,3-propylenediimine,
N,N'-bis-(alpha-2-pyridylethyl)-1,4-butylenediimine,
N,N'-bis-(beta-2-pyridylethyl)-1,5-pentylenediimine,
N,N'-bis-(beta-2-pyridylethyl)-1,2-propylenediimine,
N,N'-bis-(beta-2-pyridylethyl)-1,2-butylenediimine,
N,N'-bis-(alpha-2-pyridylethyl)-2,3-butylenediimine,
N,N'-bis-(alpha-2-pyridylethyl)-1,6-hexylenediimine,
N,N'-bis-(gamma-2-pyrrylpropyl)-ethylenediimine,
N,N'-bis-(beta-2-pyrrylethyl)-1,3-propylenediimine,
N,N'-bis-(beta-2-indolylethyl)-1,2-propylenediimine,
N,N'-bis-(beta-2-quinolylethyl)-ethylenediimine,
N,N'-bis-(alpha-3-isoquinolylethyl)-1,3-propylenediimine, and
N,N'-bis-(gamma-2-pyridylpropyl)-ethylenediimine.

Reduction of the Schiff's base or bis-imine can be readily effected at room temperature with hydrogen at a slightly elevated pressure in the presence of a catalyst such as platinum, pre-reduced platinum oxide, rhodium and palladium. The hydrogenation can be effected in liquid reaction media such as ethanol, propanol, tetrahydrofuran and dioxan. The reduction goes to completion quickly and can generally be terminated within one or two hours since in that time the theoretrical uptake of hydrogen is approximately reached. After the hydrogenation is terminated the product can be isloated by filtering the mixture and distilling the filtrate to separate the product.

Representative of the N,N'-bis-(2-heterocyclicaminoalkyl)-alkylenediamines which can be produced by reduction of the corresponding Schiff's base are:

N,N'-bis-(alpha-2-pyridylethyl)-ethylenediamine,
N,N'-bis-(alpha-2-pyridylethyl)-1,3-propylenediamine,
N,N'-bis-(alpha-2-pyridylethyl)-1,4-butylenediamine,
N,N'-bis-(alpha-2-pyridylethyl)-1,5-pentylenediamine,
N,N'-bis-(beta-2-pyridylethyl)-1,2-propylenediamine,
N,N'-bis-(beta-2-pyridylethyl)-1,2-butylenediamine,
N,N'-bis-(beta-2-pyridylethyl)-2,3-propylenediamine,
N,N'-bis-(alpha-2-pyridylethyl)-1,6-hexylenediamine,
N,N'-bis-(beta-2-pyrrylethyl)-ethylenediamine,
N,N'-bis-(beta-2-pyrrylethyl)-1,3-propylenediamine,
N,N'-bis-(beta-2-pyrrylethyl)-1,2-propylenediamine,
N,N'-bis-(gamma-2-pyrrylpropyl)-ethylenediamine,
N,N'-bis-(gamma-2-pyridylpropyl)-1,3-propylenediamine,
N,N'-bis-(beta-2-indolylethyl)-ethylenediamine,
N,N'-bis-(beta-2-quinolylethyl)-ethylenediamine, and
N,N'-bis-(gamma-3-isoquinolylpropyl)-1,2-propylenediamine.

The N,N'-bis-(2-heterocyclicaminoalkyl)-alkylenediamines provided by this invention can be alkylated to give tertiary amines. Methylation of the described diamines can be readily effected by reacting them with a mixture of formic acid and formaldehyde. The reflux temperature is advisably used to increase the reaction rate and permit ready temperature control. The methylation is effected in about 6 to 10 hours after which the product can be isolated by distilling off the formic acid-formaldehyde excess. Other isolation procedures known to those skilled in the art can also be employed.

Alkylation of the N,N'-bis-(2-heterocyclicamino)-alkylenediamines can also be effected by reacting the diamines with an alkyl halide, or with an acyl halide followed by reduction with lithium aluminum hydride.

The process using alkyl halides can be illustrated as follows:

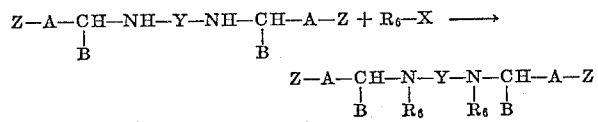

wherein X is a reactive halogen such as bromine or chlorine, $R_6$ is a lower alkyl such as methyl, ethyl, propyl and butyl and A, B, Y and Z have the significance assigned above.

Alkyl halides such as methyl chloride, ethyl bromide, propyl chloride, butyl bromide, pentyl chloride and isopropyl chloride can be used for the alkylation. Only a sufficient amount of the alkyl halide is employed to form a bis-tertiary amine and to avoid the formation of a quaternary salt. The reaction can be effected by bringing the diamine and alkyl halide together in a suitable water free liquid reaction medium such as methanol, ethanol, isopropanol, dioxane or tetrahydrofuran. The reaction proceeds at room temperature but elevated temperatures such as up to and including the reflux temperature are advisably employed. The reaction is substantially completed in a few hours. The product can be recovered by adding an aqueous inorganic base to the reaction mixture, extracting with an immiscible solvent and separating the product by fractional distillation.

Some of the products which are produced by this alkylation process are:

N,N'-bis-(alpha-2-pyridylethyl)-N,N'-dimethylethylenediamine,
N,N'-bis-(alpha-2-pyridylethyl)-N,N'-diethyl-1,3-propylenediamine,
N,N'-bis-(alpha-2-pyridylethyl)-N,N'-dipropyl-1,4-butylenediamine,
N,N'-bis-(beta-2-pyridylethyl)-N,N'-diethyl-1,5-pentylenediamine,
N,N'-bis-(beta-2-pyridylethyl)-N,N'-dibutyl-1,2-propylenediamine,
N,N'-bis-(beta-2-pyridylethyl)-N,N'-dimethyl-1,2-butylenediamine,
N,N'-bis-(beta-2-pyridylethyl)-N,N'-diethyl-2,3-butylenediamine,
N,N'-bis-(alpha-2-pyridylethyl)-N,N'-dimethyl-1,6-hexylenediamine,
N,N'-bis-(gamma-2-pyrrylpropyl)-N,N'-dimethylethylenediamine,
N,N'-bis-(beta-2-pyrrylethyl)-N,N'-diethyl-1,3-propylenediamine,
N,N'-bis-(beta-2-indolylethyl)-N,N'-dimethyl-1,2-propylenediamine, and
N,N'-bis-(beta-2-quinolylethyl)-N,N'-diethyl-1,3-propylenediamine.

Alkylation of the N,N'-bis-(2-heterocyclicaminoalkyl)-alkylenediamines can also be effected by first acylating the diamines and then reducing the acyl group. This process can be represented as follows:

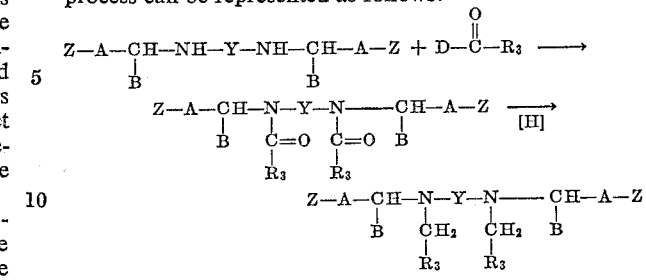

wherein $R_3$ is hydrogen or a lower alkyl such as methyl, ethyl, propyl, isopropyl, butyl and pentyl and D is a reactive halogen such as bromine and chlorine, or a lower alkoxy such as methoxy or ethoxy and A, B, Y and Z have meanings assigned above.

Some of the acyl halides which can be used to introduce the acyl group are acetyl chloride, propionyl bromide, butyryl chloride, isopropionyl bromide, caproyl chloride and caprylyl bromide.

The acylation can be effected with an acyl halide by bringing it and the diamine together in an inert liquid reaction medium such as benzene, xylene, n-heptane and toluene. Approximately equimolar amounts of reactants can be employed. The reaction proceeds at room temperature although elevated temperatures such as the reflux temperature can be used to increase the reaction rate. A small amount of a strong organic base such as triethylamine can be included in the reaction mixture to bind the hydrohalic acid released by the reaction. After the reaction is completed, which generally takes no more than 1 to 3 hours, the reaction mixture can be treated according to conventional manipulative techniques to isolate the desired product.

The diamines can also be acylated by the use of lower alkyl esters of lower carboxylic acids such as methyl formate, ethyl acetate and methyl propionate. The reaction can be effected under liquid reaction conditions provided by use of an excess of the ester or an inert solvent such as ether or tetrahydrofuran. The reflux temperature is preferred for effecting the reaction.

Some of the intermediate products prepared by acylation of the diamines are:

N,N'-bis-(alpha-2-pyridylethyl)-N,N'-diacetylethylenediamine,
N,N'-bis-(alpha-2-pyridylethyl)-N,N'-dipropionyl-1,3-propylenediamine,
N,N'-bis-(alpha-2-pyridylethyl)-N,N'-dibutyryl-1,4-butylenediamine,
N,N'-bis-(beta-2-pyridylethyl)-N,N'-diformyl-1,5-pentylenediamine,
N,N'-bis-(beta-2-pyridylethyl)-N,N'-alpha-methylpropionyl-1,2-propylenediamine,
N,N'-bis-(alpha-2-pyridylethyl)-N,N,'-dicaproyl-1,2-butylenediamine,
N,N,'-bis-(beta-2-pyridylethyl)-N,N'-diacetyl-2,3-butylenediamine,
N,N'-bis-(alpha-2-pyridylethyl)-N,N'-diformyl-1,6-hexylenediamine,
N,N'-bis-(alpha-2-pyrrylethyl)-N,N'-diacetylethylenediamine,
N,N'-bis-(beta-2-pyrrylethyl)-N,N'-dipropionyl-1,3-propylenediamine, and
N,N'-bis-(gamma-2-quinolylpropyl)-N,N'-diformyl-1,2-propylenediamine.

The N,N'-bis-(2-heterocyclicaminoalkyl)-N,N'-diacylalkylenediamines can be reduced to the corresponding N,N'-dialkylalkylenediamines by the use of lithium aluminum hydride, using only enough of the reducing agent to reduce the acyl groups and to avoid partial hydrogenation of the pyridine rings. The reduction can be effected by combining the reactants in an inert anhydrous liquid reaction medium such as dioxane, tetrahydrofuran or ether. The reduction is generally effected at the reflux temperature in 1 to 8 hours. After the reaction is terminated water can be added to the mixture to decompose excess lithium aluminum hydride. To recover the product, the organic phase is separated and the aqueous residue extracted with the same solvent. The organic phase and extracts can then be combined, dried and the product distilled. In this way, N,N'-bis-(2-heterocyclicaminoalkyl)-N,N'-dialkylalkylenediamines such as those named above can be produced.

Acid addition salts of the described compounds are readily formed by reacting the diamines with a mineral or organic acid such as hydrochloric, sulfuric, formic, acetic, citric, maleic, fumaric, phosphoric and dithioxamide (rubeanic acid).

Quaternary ammonium salts such as the dimethyl sulfate, methyl chloride, ethyl bromide and methyl iodide are readily produced from the diamines.

The compounds of this invention, in the form of non-toxic acid addition salts other than penicillin salts, produce a lowering of the blood pressure in animals and also reverse the pressor effects of epinephrine. In addition, the free bases are buffering or neutralizing agents. The compounds also have excellent chelating activity for metals including copper and nickel.

N,N'-bis(alpha-2-pyridylethyl)-ethylenediamine is effective as an anti-hypertensive agent. N,N'-bis-(alpha-2-pyridylethyl)-1,2-propylenediamine is considerably more potent in hypotensive action as shown in normotensive anesthetized dogs. N,N' - bis - (alpha - 2 - pyridylethyl)-1,5 - pentylenediamine, N,N' - bis - (2 - pyridylmethyl)-ethylenediamine and N,N' - bis - (2 - pyrrylmethyl)-ethylenediamine have anti-hypertensive activity about equal to that of N,N' - bis - (alpha - 2 - pyridylethyl)-ethylenediamine.

Daily administration of from about 10 to 500 mg. of one or more of the diamines is usually sufficient for treating hypertension in an animal although the dosage must, of course, be prescribed according to the animal species, age and weight. The drug is advisably administered periodically during the day with from one to four dosages being most common.

The compounds, when used as therepeutics, can be administered as pure compounds. It is advisable, however, to first combine one or more of the novel compounds with a suitable pharmaceutical carrier to attain a more satisfactory size to dosage relationship.

Pharmaceutical carriers which are liquid or solid can be used. The preferred liquid carrier is water. Flavoring materials can be included in the solutions as desired.

Solid pharmaceutical carriers such as starch, sugar, talc and the like can be used to form powders. The powders can be used as such for direct administration or, instead, the powders can be added to suitable foods and liquids, including water, to facilitate administration.

The powders also can be used to make tablets, or to fill gelatin capsules. Suitable lubricants like magnesium stearate, binders such as gelatin, and disintegrating agents like sodium carbonate in combination with citric acid can be used to form the tablets.

Unit dosage forms for oral administration, such as tablets and capsules, can contain any suitable predetermined amount of one or more of the compounds, and they can be administered one or more at a time at regular intervals. Such unit dosage forms, however, should generally contain a concentration of 0.1% to 50% by weight of one or more of the active compounds. Unit dosage forms can contain from about 10 mg. to 500 mg. of the diamine although generally from 10 to 150 mg. is included therein.

The oral route of administration is recommended.

The following examples illustrate methods of making the compounds.

*Example 1.—N,N'-bis-(alpha-2-pyridylethyl)-ethylenediamine*

A mixture of 121 g. (1.0 mole) of 2-acetylpyridine, 37.1 g. (0.50 mole) of 81% ethylenediamine and 200 cc. of benzene was refluxed and the water formed during the reaction was removed azeotropically. On cooling to room temperature, the N,N' - bis - (alpha - 2 - pyridylethyl) - ethylenediimine crystallized out, M.P. 117–118° C., yield 65 g. An additional 36 g. of product was collected on concentration of the filtrate, total yield 102 g. (76%).

A solution of 53.3 g. (0.20 mole) of the bis-imine in 175 cc. of ethanol was reduced in the presence of 0.4 g. of pre-reduced platinum and 60 p.s.i. of hydrogen at room temperature. The catalyst was removed by filtration and the product collected by distillation, B.P. 154–156° C., (0.25 mm.), yield 48 g. (89%).

*Analysis.*—Calcd. for $C_{16}H_{22}N_4$: N, 2075. Found: N, 20.35.

*Example 2.—N,N'-bis-(alpha-2-pyridylethyl)-ethylenediamine dimaleate*

To 11.6 g. (0.10 mole) of maleic acid dissolved in 50 cc. of ethanol was added 13.5 g. (0.05 mole) of the diamine of Example 1 in 50 cc. of anhydrous ether. The solid was isolated by filtration and washed with ethanol, yield 23.3 g. (93%), M.P. 162–163° C.

*Analysis.*—Calcd. for $C_{24}H_{30}N_4O_8$: N, 11.15; neutral equivalent, 125.6. Found: N, 11.05; neutral equivalent, 123.9.

*Example 3.—N,N'bis-(alpha-2-pyridylethyl)-N,N'-diformylethylenediamine*

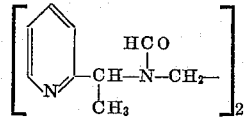

To 32.7 g. (0.12 mole) of the diamine of Example 1 was added 35.9 g. (0.48 mole) of ethyl formate. The mixture was stirred and refluxed for 5 hours and fractionally distilled in vacuo, B.P. 165–187° C. (0.01–0.03 mm.), yield 30 g. (76%).

*Example 4.—N,N'-bis-(alpha-2-pyridylethyl)-N,N'-dimethylethylenediamine*

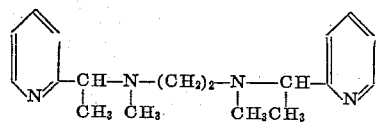

To 14 g. (0.37 mole) of lithium aluminum hydride in 250 cc. of dry tetrahydrofuran there was added dropwise 30 g. (0.092 mole) of the diformyl derivative of Example 3 dissolved in tetrahydrofuran. The mixture was stirred and refluxed for an additional 3 hours and the complex then decomposed by the addition of 15 cc. of water followed by 35 cc. of 40% potassium hydroxide. The inorganic salts were removed by filtration, the organic phase separated and dried with potassium carbonate. The product was isolated by fractional distillation; B.P. 168–172° C. (0.08 mm.), yield 13.4 g. (48.6%).

*Analysis.*—Calcd. for $C_{18}H_{26}N_4$: N, 18.78. Found: N, 18.71.

*Example 5.—N,N,'-bis-(alpha-2-pyridylethyl)-N,N'-dimethylethylenediamine tetrahydrochloride*

To 10.2 g. (0.034 mole) of the base of Example 4 in 600 cc. of anhydrous ether was added ethereal HCl to a pH of 3. The precipitate was isolated by filtration, M.P. 170° C., dec., yield 15 g. (100%).

*Analysis.*—Calcd. for $C_{18}H_{30}Cl_4N_4$: N, 12.60; Cl, 31.75. Found: N, 12.61; Cl, 31.30.

Example 6.—N,N'-bis-(alpha-2-pyridylethyl)-1,2-propylenediamine 2-acetylpyridine (24.2 g., 0.2 mole), 8.2 g. (0.2 mole) of 90% 1,2-propylenediamine and 200 cc. of dry benzene were refluxed together with stirring for 8 hours. Water was removed from the reaction by means of a water separator until approximately the theoretical amount had been collected. The solvent was removed under vacuum and the residue of N,N'-bis-(alpha-2-pyridylethyl)-1,2-propylenediimine was dissolved in 200 cc. of absolute ethanol. To this solution was added 0.5 g. of platinum dioxide and reduction under 60 p.s.i. hydrogen at room temperature was carried out. The catalyst was collected and rinsed with ethanol. The solvent was removed under vacuum from the combined filtrates and washings and the residue distilled. The fraction boiling at 140–145° C./0.04 mm. was taken as product and provided 168 g. (59%).

*Analysis.*—Calcd. for $C_{17}H_{24}N_4$: N, 19.70. Found: N, 19.71.

Example 7.—N,N'-bis-(alpha-2-pyridylethyl)-1,2-propylenediamine difumarate

A solution of 5.0 g. (0.018 mole) of the base from Example 6 in 50 cc. dry ether was added to a solution of 4.1 g. (0.036 mole) of fumaric acid in 90 cc. of absolute ethanol. An exothermic reaction ensued. After cooling and diluting to 400 cc. with dry ether, the precipitate was collected and dried to afford 7.6 g. (82%) of the product, M.P. 123–124° C.

*Analysis.*—Calcd. for $C_{25}H_{32}N_4O_8$: C, 58.13; H, 6.24; N, 10.85. Found: C, 58.34; H, 6.78; N, 11.08.

Example 8.—N,N'-bis-(alpha-2-pyridylethyl)-1,3-propylenediamine

A procedure essentially identical to that given in Example 6 was used to prepare this compound by reacting 2-acetylpyridine with 1,3-propylenediamine to produce N,N'-bis-(alpha-2-pyridylethyl)-1,3-propylenediimine which was then reduced to the diamine. A yield of 63% was obtained and the material boiled at 148–152°/0.23 mm.

*Analysis.*—Calcd. for $C_{17}H_{24}N_4$: N, 19.70. Found: N, 19.51.

Example 9.—N,N'-bis-(alpha-2-pyridylethyl)-1,5-pentylenediamine

A procedure essentially identical to that given in Example 6 was used to prepare this compound by reacting 2-acetylpyridine with 1,5-pentylenediamine to produce N,N'-bis-(alpha-2-pyridylethyl)-1,5-pentylenediimine which was then reduced to the diamine. A yield of 47% was obtained and the material boiled at 167–168° C./0.05 mm.

*Analysis.*—Calcd. for $C_{19}H_{28}N_4$: N, 17.93. Found: N, 17.20.

Example 10.—N,N'-bis-(alpha-2-pyridylethyl)-1,5-pentylenediamine dimaleate

A solution of 3.1 g. (0.010 mole) of the base from Example 9 in 20 ml. of absolute ethanol was added to a solution of 2.3 g. (0.020 mole) maleic acid in 20 ml. of ethanol. The resultant solution was diluted with 200 ml. of dry ether and the precipitate which formed was collected, washed with ether and dried. This crude product was triturated first with 100 ml. of 1/1 ethanol/ether and then with 100 ml. of 1/1 isopropanol/ether, collected and dried to afford 3.4 g. (63%) of product, M.P. 148–150° C.

*Analysis.*—Calcd. for $C_{27}H_{36}N_4O_8$: N, 10.28; maleic acid, 42.63. Found: N, 9.95; maleic acid, 42.88.

Example 11.—N,N'-bis-(2-pyridylmethyl)-ethylenediamine

To a solution of 107 g. (1.0 mole) of pyridine-2-carboxaldehyde in 200 ml. of dry benzene was added slowly with stirring 41.3 ml. of 72.8% (0.5 mole) of ethylenediamine solution. An exothermic reaction ensued. The mixture was refluxed using a water separator until the theory water had been collected. The solvent was removed under vacuum and the residue of N,N'-bis-(2-pyridylmethyl)-ethylenediimine was dissolved in 500 ml. of ethanol. 1 g. of platinum was added to this solution and reduction was accomplished under 60 p.s.i. hydrogen at room temperature. The catalyst was collected and rinsed with alcohol. The solvent was removed from the combined filtrate and washings and the residue distilled. The fraction boiling at 151–158° C./0.8 mm was taken as product and afforded 40 g. (31%).

*Analysis.*—Calcd. for $C_{14}H_{18}N_4$: N, 23.12. Found: N, 23.02.

Example 12.—N,N'-bis-(2-pyridylmethyl)-ethylenediamine dimaleate

A solution of 3.5 g. (0.013 mole) of the base from Example 11 in 25 ml. of alcohol was added to a solution of 3.0 g. (0.025 mole) of maleic acid in 20 ml. of alcohol. A precipitate formed immediately. After cooling, the solid was collected, washed with ethanol and dried to yield 5.5 g. (89%) of product, M.P. 177–178° C.

*Analysis.*—Calcd. for $C_{22}H_{26}N_4O_8$: N, 11.78; maleic acid, 48.83. Found: N, 11.63; maleic acid, 50.64.

Example 13.—N,N'-bis-(2-pyrrylmethyl)-ethylenediamine dihydrochloride

To a solution of 27.6 g. (0.25 mole) of pyrrole-2-carboxaldehyde in 100 ml. of dry benzene was added 10.4 ml. of 72% ethylenediamine. After refluxing for 8 hours, the precipitate which formed was collected, rinsed with benzene and dried to afford 1,2-bis-(2-pyrrolcarboxaldimine)-ethane (100%), M.P. 178–182° C. Platinum dioxide (0.25 g.) was added to a solution of 26.8 g. (0.125 mole) of this Schiff's base in 200 ml. of ethanol. Reduction was carried out under 60 p.s.i. hydrogen. The catalyst was collected and rinsed with ethanol. To the combined filtrate and washings was added excess ethereal HCl. The solid which formed was collected and recrystallized from methanol to afford 6.7 g. (16%) of the product, M.P. 315–320° C. (dec.).

*Analysis.*—Calcd. for $C_{12}H_{20}H_4Cl_2$: N, 19.24; Cl, 24.35. Found: N, 19.09; Cl, 24.35.

Example 14.—N,N'-bis-(beta-2-pyridylethyl)-ethylenediamine

A solution of 21.0 g. (0.20 mole) of 2-vinyl pyridine, 6.1 g. of 88% (0.090 mole) of ethylenediamine, and 12.0 g. (0.20 mole) of glacial acetic acid in 100 ml. of ethanol was refluxed for 6 hours under nitrogen. The reaction mixture was reduced in vacuo to a syrup, treated with dilute NaOH, and extracted twice with tetrahydrofuran. The separated and combined organic layers were dried over sodium sulfate, stripped, and the resultant oil was fractionated. Material distilling at 173–177° C./0.2 mm. was taken as product and amounted to 10.8 g. (45%).

*Analysis.*—Calcd. for $C_{16}H_{22}N_4$: N, 20.68. Found: N, 20.50.

Example 15.—N,N'-bis-(beta-2-pyridylethyl)-ethylenediamine dimaleate

A solution of 10.0 g. (0.037 mole) of the base from Example 14 in 50 ml. of ether was added to a solution of 8.56 g. (0.075) mole of maleic acid in 30 ml. of ethanol and the mixture diluted with 100 ml. of ether. The crude product which separated was collected and recrystallized from methanol to afford 5.1 g. (28%) of pure product, M.P. 175–176° C.

*Analysis.*—Calcd. for $C_{24}H_{30}N_4O_8$: C, 57.60; N, 6.04; N, 11.15; N.E., 125.6. Found C, 57.46; H, 6.11; N, 11.22; N.E. 122.6.

As used herein the term "2-hterocyclicamino" is intended to indicate that the alkyl is bonded to the carbon in the ring ortho to the nitrogen in the ring.

What is claimed is:

1. A unit dosage pharmaceutical composition consisting essentially of about 10 to 500 mg. of a member of the group consisting of compounds of the formula

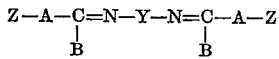

and

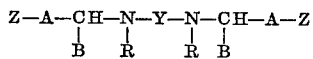

wherein Y is a lower alkylene having two to four carbons in a chain between the nitrogens, wherein A is the group represented by the expression —(CH)$_n$— and $n$ equals 0 to 5, B is a member of the group consisting of hydrogen and lower alkylene groups, R is a member of the group consisting of hydrogen, lower alkyl and groups of the formula

wherein $R_2$ is lower alkyl, and Z is a member of the group consisting of 2-pyridyl, 2-pyrryl, 2-indolyl, 3-isoindolyl, 2-quinolyl and 3-isoquinolyl, and nontoxic acid addition salts thereof, and an inert pharmaceutical carrier.

2. A unit dosage pharmaceutical composition comprising about 10 to 150 mg. of N,N′-bis-(alpha-2-pyridylethyl)-1,2-propylenediamine as an active ingredient, and an inert pharmaceutical carrier.

3. A unit dosage pharmaceutical composition comprising about 10 to 150 mg. of N,N′-bis-(2-pyridylmethyl)-ethylenediamine as an active ingredient, and an inert pharmaceutical carrier.

4. A unit dosage pharmaceutical composition comprising about 10 to 150 mg. of N,N′-bis-(2-pyrrylmethyl)-ethylenediamine as an active ingredient, and an inert pharmaceutical carrier.

5. A unit dosage pharmaceutical composition comprising about 10 to 150 mg. of N,N′-bis-(alpha-2-pyridylethyl)-ethylenediamine as an active ingredient, and an inert pharmaceutical carrier.

6. A unit dosage pharmaceutical composition comprising about 10 to 150 mg. of N,N′-bis-(alpha-2-pyridylethyl)-ethylenediamine dimaleate, and an inert pharmaceutical carrier.

7. Compositions according to claim 1 in tablet form.

8. Compositions according to claim 1 in capsule form.

9. The method of inducing an antihypertensive effect in an animal which comprises orally administering to an animal 10 to 500 mg. of a member of the group consisting of compounds of the formula

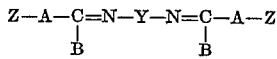

and

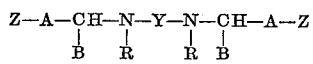

wherein Y is a lower alkylene having two to four carbons in a chain between the nitrogens, consisting of wherein A is the group represented by the expression —(CH)$_n$— and $n$ equals 0 to 5, group consisting of hydrogen and lower alkylene groups, R is a member of the group consisting of hydrogen, lower alkyl and groups of the formula

wherein $R_2$ is lower alkyl, and Z is a member of the group consisting of 2-pyridyl, 2-pyrryl, 2-indolyl, 3-isoindolyl, 2-quinolyl and 3-isoquinolyl, and nontoxic acid addition salts thereof.

10. The method of inducing an antihypertensive effect in an animal which comprises orally administering to an animal 10 to 150 mg. of N,N′-bis-(alpha-2-pyridylethyl)-1,2-propylenediamine.

11. The method of inducing an antihypertensive effect in an animal which comprises orally administering to an animal 10 to 150 mg. of a nontoxic acid addition salt of N,N′-bis-(alpha-2-pyridylethyl)-1,2-propylenediamine.

12. The method of inducing an antihypertensive effect in an animal which comprises orally administering to an animal 10 to 150 mg. of N,N′-bis-(2-pyridylmethyl)-ethylenediamine.

13. The method of inducing an antihypertensive effect in an animal which comprises orally administering to an animal 10 to 150 mg. of a nontoxic acid addition salt of N,N′-bis-(2-pyridylmethyl)-ethylenediamine.

14. The method of inducing an antihypertensive effect in an animal which comprises orally administering to an animal 10 to 150 mg. of N,N′-bis-(2-pyrrylmethyl)-ethylenediamine.

15. The method of inducing an antihypertensive effect in an animal which comprises orally administering to an animal 10 to 150 mg. of a nontoxic acid addition salt of N,N′-bis-(2-pyrrylmethyl)-ethylenediamine.

16. The method of inducing an antihypertensive effect in an animal which comprises orally administering to an animal 10 to 150 mg. of N,N′-bis-(alpha-2-pyridylethyl)-ethylenediamine.

17. The method of inducing an antihypertensive effect in an animal which comprises orally administering to an animal 10 to 150 mg. of a nontoxic acid addition salt of N,N′-bis-(alpha-2-pyridylethyl)-ethylenediamine.

18. The method of inducing an antihypertensive effect in an animal which comprises orally administering 10 to 150 mg. of N,N′-bis-(alpha-2-pyridylethyl)-ethylenediamine dimaleate to an animal.

References Cited by the Examiner

UNITED STATES PATENTS

| | | | |
|---|---|---|---|
| 2,534,914 | 12/50 | Kendall et al. | 260—240 |
| 2,667,494 | 1/54 | Emerson et al. | 260—240 |
| 2,709,700 | 5/55 | Szabo et al. | 260—239.1 |
| 2,739,981 | 3/56 | Szabo et al. | 260—296 |
| 2,876,236 | 3/59 | Szabo et al. | 260—296 |
| 2,987,442 | 6/61 | McLean et al. | 167—65 |
| 3,037,910 | 6/62 | Copp et al. | 167—65 |

OTHER REFERENCES

Biel et al., J.A.C.S., volume 80, No. 17, pages 4609–13, September 5, 1958.

Chemical Abstracts, Decennial Index, volumes 41–50, page 4939s (1947–56) (abstract of Szabo II).

Drill, Pharmocology in Medicine, 1954, McGraw-Hill, New York, page 26/20.

FRANK CACCIAPAGLIA, JR., *Primary Examiner.*

MORRIS O. WOLK, LEWIS GOTTS, *Examiners.*

UNITED STATES PATENT OFFICE
CERTIFICATE OF CORRECTION

Patent No. 3,205,133                        September 7, 1965

John H. Biel et al.

It is hereby certified that error appears in the above numbered patent requiring correction and that the said Letters Patent should read as corrected below.

Column 1, line 46, for "presser" read -- pressor --; line 52, for "N,N-" read -- N,N'- --; column 4, line 71, for "-dialkylakylenediamines" read -- -dialkylalkylenediamines --; column 6, line 18, for "2075" read -- 20.75 --; column 8, line 65, for "(0.075) mole" read -- (0.075 mole) --; line 73, for '"2-hterocyclicamino"' read -- "2-heterocyclicamino" --; column 9, lines 16 to 18, strike out "wherein A is the group represented by the expression $-(CH)_n-$ and n equals 0 to 5," and insert instead -- A is a member of the group consisting of a single chemical bond and lower alkylene group, --; lines 65 to 67, strike out "consisting of wherein A is the group represented by the expression $-(CH)_n-$ and n equals 0 to 5," and insert instead -- A is a member of the group consisting of a single chemical bond and lower alkylene groups, B is a member of the --.

Signed and sealed this 12th day of April 1966.

(SEAL)
Attest:

ERNEST W. SWIDER                        EDWARD J. BRENNER
Attesting Officer                     Commissioner of Patents